United States Patent
Polo-Malouvier et al.

(10) Patent No.: US 7,899,837 B2
(45) Date of Patent: Mar. 1, 2011

(54) APPARATUS AND METHOD FOR GENERATING QUERIES AND REPORTS

(75) Inventors: Ricardo Polo-Malouvier, Levallois-Perret (FR); Grégoire Jean Antoine Cacheux, Puteaux (FR); Gilles Vergnory-Mion, Vaucresson (FR); Mark Allerton, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 286 days.

(21) Appl. No.: 11/537,592

(22) Filed: Sep. 29, 2006

(65) Prior Publication Data

US 2008/0082494 A1    Apr. 3, 2008

(51) Int. Cl.
G06F 7/00    (2006.01)
G06F 17/30    (2006.01)

(52) U.S. Cl. .................................... 707/759; 707/769
(58) Field of Classification Search .................. None
See application file for complete search history.

(56) References Cited

U.S. PATENT DOCUMENTS

| | | | |
|---|---|---|---|
| 5,550,971 A * | 8/1996 | Brunner et al. ............... 707/3 |
| 5,657,437 A | 8/1997 | Bishop et al. |
| 5,664,182 A | 9/1997 | Nierenberg et al. |
| 5,692,181 A * | 11/1997 | Anand et al. ..................... 1/1 |
| 5,721,903 A * | 2/1998 | Anand et al. .................. 707/5 |
| 5,740,429 A | 4/1998 | Wang et al. |
| 5,862,400 A | 1/1999 | Reed et al. |
| 5,875,446 A | 2/1999 | Brown et al. |
| 6,026,388 A | 2/2000 | Liddy et al. |
| 6,081,810 A * | 6/2000 | Rosenzweig et al. ............ 1/1 |
| 6,160,549 A * | 12/2000 | Touma et al. ............... 715/762 |
| 6,247,018 B1 * | 6/2001 | Rheaume ..................... 707/102 |
| 6,341,286 B1 * | 1/2002 | Kawano ...................... 707/101 |
| 6,393,422 B1 | 5/2002 | Wone |
| 6,539,370 B1 | 3/2003 | Chang et al. |
| 6,578,046 B2 | 6/2003 | Chang et al. |
| 6,581,054 B1 * | 6/2003 | Bogrett .......................... 707/4 |
| 6,609,123 B1 * | 8/2003 | Cazemier et al. ............... 707/4 |
| 6,711,579 B2 * | 3/2004 | Balakrishnan ............... 707/102 |
| 6,721,745 B2 * | 4/2004 | Monestere, III ............... 707/10 |
| 6,772,156 B1 | 8/2004 | Rogers et al. |
| 6,778,979 B2 * | 8/2004 | Grefenstette et al. ............. 1/1 |
| 6,831,668 B2 | 12/2004 | Cras et al. |
| 7,152,200 B2 * | 12/2006 | Albert et al. ................ 715/234 |
| 7,287,214 B1 | 10/2007 | Jenkins et al. |
| 7,293,031 B1 * | 11/2007 | Dusker et al. ............... 707/101 |
| 7,356,779 B2 | 4/2008 | Cras et al. |
| 7,546,312 B1 | 6/2009 | Xu et al. |
| 2002/0123994 A1 | 9/2002 | Schabes et al. |

(Continued)

OTHER PUBLICATIONS

Domeniconi et al., Subspace clustering of high dimensional data (undated article). Google Search 2004 (pp. 1-5).

(Continued)

Primary Examiner — Tim T. Vo
Assistant Examiner — Jeremy D Engelskirchen
(74) Attorney, Agent, or Firm — Cooley LLP

(57) ABSTRACT

A computer readable storage medium includes executable instructions to extract data model object information and report data values from data model objects in at least one semantic abstraction to define indexed fields. A search query is received. The search query is applied against the indexed fields to define matching data model objects and matching report data values. A proposed abstract query with at least one matching data model object and a corresponding semantic abstraction is generated.

14 Claims, 10 Drawing Sheets

U.S. PATENT DOCUMENTS

| | | |
|---|---|---|
| 2002/0161799 A1 | 10/2002 | Maguire et al. |
| 2003/0212666 A1 | 11/2003 | Basu et al. |
| 2003/0215137 A1 | 11/2003 | Wnek |
| 2004/0024739 A1 | 2/2004 | Copperman et al. |
| 2004/0088650 A1 | 5/2004 | Killen et al. |
| 2004/0117731 A1 | 6/2004 | Blyashov |
| 2004/0267740 A1 | 12/2004 | Liu et al. |
| 2005/0027687 A1* | 2/2005 | Nowitz et al. ............ 707/3 |
| 2005/0076003 A1 | 4/2005 | DuBose et al. |
| 2005/0144554 A1* | 6/2005 | Salmon et al. ............ 715/501.1 |
| 2005/0182709 A1 | 8/2005 | Belcsak et al. |
| 2005/0198068 A1 | 9/2005 | Mukherjee et al. |
| 2005/0203876 A1* | 9/2005 | Cragun et al. ............ 707/3 |
| 2005/0210389 A1 | 9/2005 | Middlefart |
| 2005/0234889 A1 | 10/2005 | Fox et al. |
| 2006/0047565 A1 | 3/2006 | Gilfix et al. |
| 2006/0069696 A1 | 3/2006 | Becker et al. |
| 2006/0136407 A1* | 6/2006 | Dettinger et al. ............ 707/4 |
| 2006/0167860 A1 | 7/2006 | Eliashberg et al. |
| 2006/0195421 A1 | 8/2006 | Wiest et al. |
| 2006/0195424 A1 | 8/2006 | Wiest et al. |
| 2006/0271841 A1 | 11/2006 | Thanu et al. |
| 2006/0293982 A1 | 12/2006 | Hicks et al. |
| 2007/0038948 A1 | 2/2007 | Cornacchia |
| 2007/0150862 A1 | 6/2007 | Naibo et al. |
| 2008/0040308 A1 | 2/2008 | Ranganathan et al. |

OTHER PUBLICATIONS

Tory et al., A parallel coordinates style interface for exploratory volume visualization. IEEE Transactions on Visualization & Computer Graphics, vol. 11:1 (Jan.-Feb. 2005).

Fitzgerald, Special edition using crystal reports 10 (Jul. 14, 2004) pp. 244-261.

Kyd, Set up common-age charts with excel and OLAP data, Nov. 4, 2004, pp. 1-2.

Int'l Search Report, PCT/US2007/077998. Business Objects S.A. (Jul. 8, 2008).

Int'l Search Report, PCT/US2007/078003. Business Objects S.A. (Mar. 25, 2008).

Int'l Search Report, PCT/US2007/078002. Business Objects S.A. (Mar. 25, 2008).

* cited by examiner

APPARATUS AND METHOD FOR GENERATING QUERIES AND REPORTS

CROSS REFERENCE TO RELATED APPLICATIONS

This application is related to commonly owned U.S. patent application Ser. No. 11/269,145, filed Nov. 7, 2005, which is incorporated herein by reference in its entirety. This application is also related to the commonly owned and concurrently filed U.S. patent applications titled "Apparatus and Method For Searching Reports", Ser. No. 11/537,597, filed Sep. 29, 2006, and "Apparatus and Method for Receiving a Report", Ser. No. 11/537,587, filed Sep. 29, 2006, which are incorporated herein by reference in their entirety.

BRIEF DESCRIPTION OF THE INVENTION

This invention relates generally to data retrieval. More particularly, this invention relates to techniques for searching and querying business intelligence data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems such as relational databases or On Line Analytic Processing (OLAP) systems used to collect, store, and manage raw data.

A subset of business intelligence tools are report generation tools. There are a number of commercially available products to produce reports from stored data. For instance. Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

State of the art search techniques developed for searching generally unstructured datasets are not optimized for creating queries for application to an abstract structured dataset. Such state of the art search techniques typically return only unstructured data that directly matches a search query. Such techniques do not provide the ability to create an abstract query for application to an abstract structured dataset in order to return structured data results relevant to a search query.

Additionally, state of the art data query and report generation software tools generally require specialized user knowledge of such tools, typically including query specification, and report design techniques unique to the specific software tool or platform. This requirement for specialized user knowledge may present a barrier to effective use of such tools by non-expert users, or complicate the experience of trained users in locating and utilizing stored data, particularly stored business intelligence data.

Accordingly, it would be desirable to provide improved techniques for searching abstract structured data sources and reports.

SUMMARY OF INVENTION

The invention includes a computer readable storage medium with executable instructions to extract data model object information and report data values from data model objects in at least one semantic abstraction to define indexed fields. A search query is received. The search query is applied against the indexed fields to define matching data model objects and matching report data values. A proposed abstract query with at least one matching data model object and a corresponding semantic abstraction is generated.

The invention also includes a computer readable storage medium with executable instructions to extract data model object information for data model objects in at least one semantic abstraction to define a first set of indexed fields. Report data values are extracted from data model objects in report data results to define a second set of indexed fields. Search terms in a search query are applied against the first and second sets of indexed fields. A first list of search query results with matching data model objects and corresponding semantic abstractions is retrieved. A second list of search query results with matching report data values and corresponding data model objects and semantic abstractions is also retrieved. A proposed abstract query with a semantic abstraction from the first list and at least one matching data model object of the semantic abstraction is generated.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
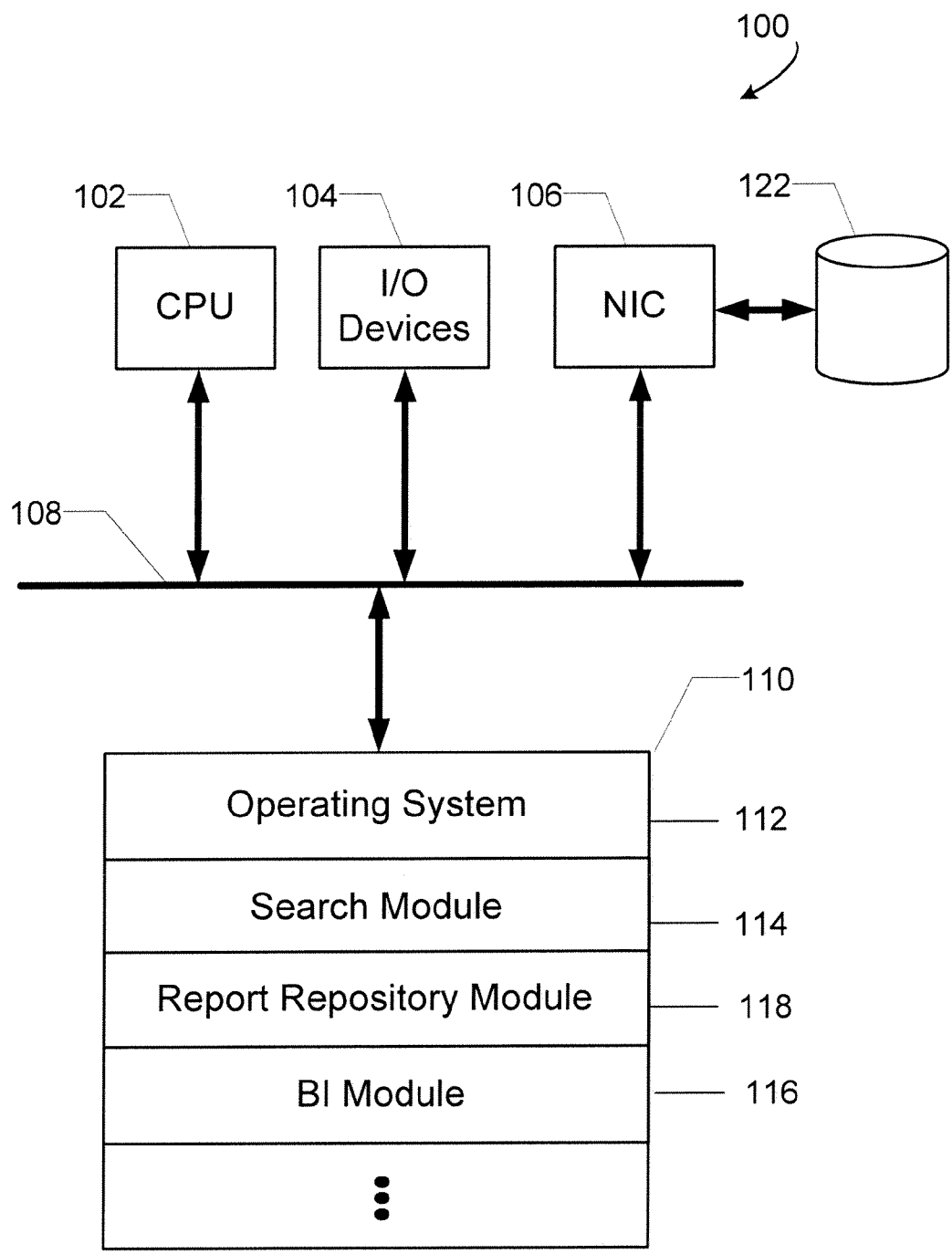
FIG. 1 illustrates a computer configured in accordance with an embodiment of the invention.

Various aspects of the present invention will now be set forth. Prior to such description, a glossary of terms used throughout this description is provided.

Semantic Abstraction is the term for a portion of a semantic layer or domain that describes at least a portion of one or more underlying data sources. A semantic abstraction typically comprises an identifier, such as a reference number or name, to identify the semantic abstraction, and one or more data model objects defined within it. An example of a semantic layer is described and claimed in commonly owned U.S. Pat. No. 5,555,403, the contents of which are incorporated herein by reference. A commercial example of a semantic layer is the Semantic Layer as described in Universe Designer business intelligence software commercially available from Business Objects S.A. of San Jose, Calif.

Data Model Object is the term for an object defined within a semantic abstraction that represents, defines and provides metadata for a dimension, attribute, measure, or other data variable or coordinate in an underlying data source. Data model objects can contain calculations from, based on, or designed to be applied to an underlying data source. Data model objects typically comprise a data model object identifier, such as a reference number, identifying the data model object, and a name, also known as a friendly name, which can be used to identify the data model object, and which is generally descriptive of the underlying data represented and defined by the data model object. A Business Object as described in Universe Designer business intelligence software commercially available from Business Objects S.A., of San Jose, Calif., is an example of a data model object.

Abstract Query is the term describing a query defined in terms of one or more semantic abstractions, typically comprising data model objects which represent an underlying data source. A semantic abstraction or collection of semantic abstractions may be used to translate an abstract query into a data query which can be executed against one or more data sources.

Search Query is the term describing one or more values for which corresponding results are sought. Typically, the search query comprises one or more search terms, such as text strings or numbers, that are compared against index records when executing a search to retrieve results from the index records that match one or more search terms.

Report Data Results is the term describing data incorporated or stored in a report document, which has been previously returned from one or more data sources in response to one or more abstract report queries made by a report generation tool, where the one or more abstract report queries have been translated into data queries by a semantic abstraction before being executed against the data source(s). Report data results typically comprise data model objects (referenced by identifier and/or name) used in the abstract report query(ies), and returned report data values from the data source(s) represented and/or defined by the data model objects used in the abstract report query(ies).

FIG. 1 illustrates a computer 100 configured in accordance with an embodiment of the invention. The computer 100 includes standard components, including a central processing unit 102 and input/output devices 104, which are linked by a bus 108. The input/output devices 104 may include a keyboard, mouse, touch screen, monitor, printer, and the like. A network interface circuit 106 is also connected to the bus 108. The network interface circuit 106 provides connectivity to a network, such as a networked data repository 122, thereby allowing the computer 100 to operate in a networked environment.

A memory 110 is also connected to the bus 108. The memory 110 stores executable instructions to implement operations of the invention. In one embodiment, the executable instructions include an operating system module 112. The operating system module 112 may include instructions for handling various system services, such as file and application services or for performing hardware dependant tasks. The operating system module 112 may include instructions for implementing a graphical user interface (GUI), which may rely upon standard techniques to produce graphical components of a user interface, e.g., windows, icons, buttons, menus and the like.

Memory 110 also stores a search module 114. The search module 114 comprises executable instructions to extract data model object information, such as data model object names and identifiers and corresponding semantic abstraction identifiers and data values to define indexed fields. The search module 114 executes search queries against indexed fields. The search module 114 may also comprise instructions to access stored report data results from a memory, or other storage location, such as networked data repository 122, in order to extract and index data object names and corresponding data values from the stored report data results.

Memory 110 also stores Report Repository Module 118. Report Repository Module 118 comprises executable instructions to store and access one or more report documents comprising report data results. In one embodiment of the present invention, the Report Repository Module 118 comprises a file directory storing one or more report documents and comprising executable instructions to store and access the report documents. In another embodiment, the Report Repository Module 118 comprises executable instructions to store and access report documents comprising report data results on a suitable storage medium such as networked data repository 122 connected to computer 100.

Memory 110 also stores an optional BI module 116. BI module 116 comprises executable instructions to perform Business Intelligence (BI) related functions, such as generate data queries, perform queries and analyses, generate, view or share reports, and the like. In one embodiment, BI module 116 stores instructions to generate a data query, run the data query against a data source to return data results, and generate a report comprising the returned data results. Such generated reports may be stored and accessed by the Report Repository Module 118.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed. For example, in one embodiment of the present invention, search module 114 may be implemented on a client computer, while the Report Repository Module 118 and/or optional BI module 116 may be implemented on a server computer.

Figure 2:
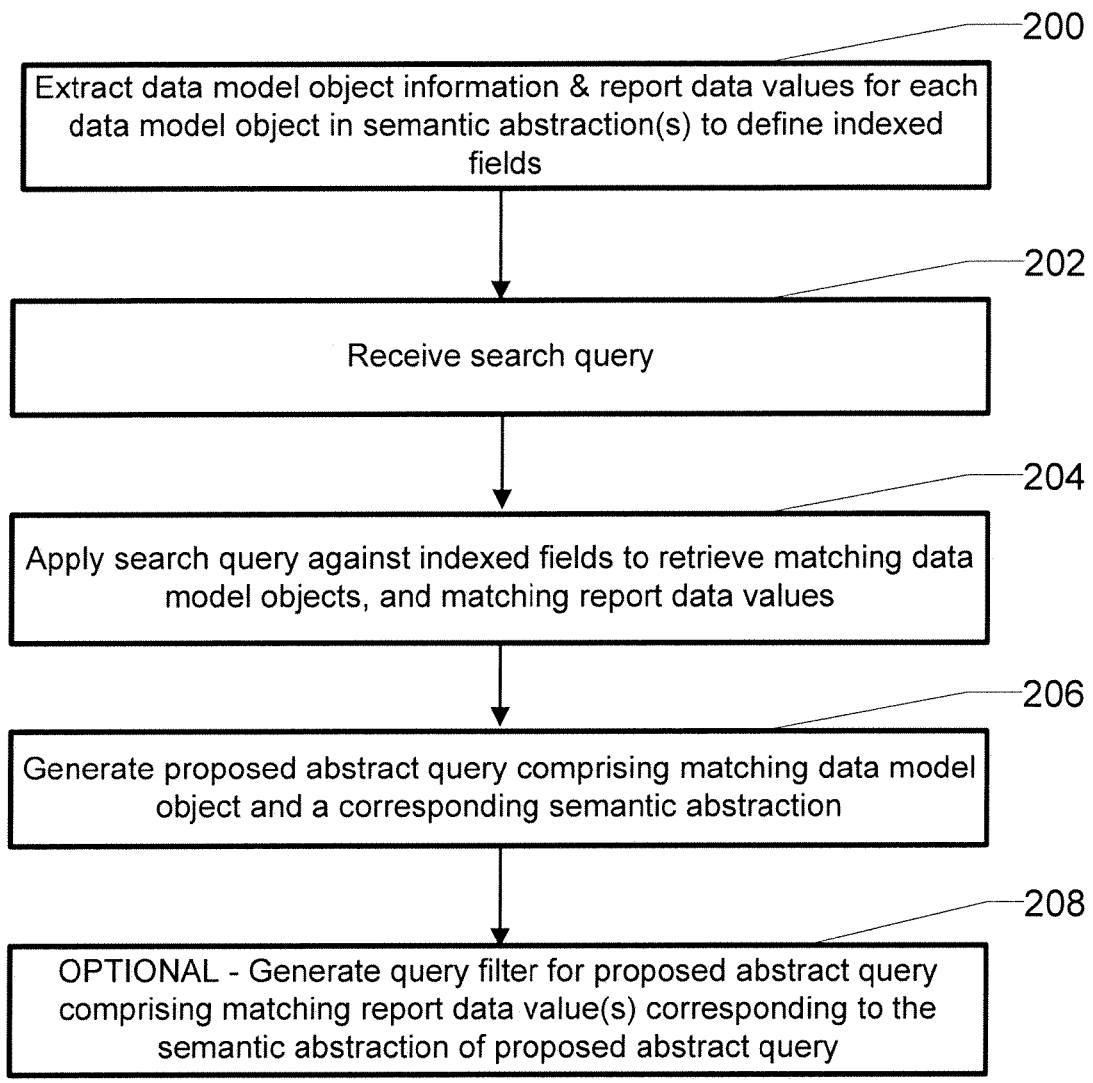
FIG. 2 illustrates processing operations associated with an embodiment of the invention.

FIG. 2 illustrates a series of processing operations that may be implemented by the computer 100 of FIG. 1. The first processing operation of FIG. 2 is to extract data model object information and report data values for data model objects in one or more semantic abstractions to define indexed fields 200. Search module 114 may be used to implement operation 200. In an embodiment of the invention, data model object information comprises at least one of: a data model object name, data model object identifier, and a corresponding semantic abstraction identifier, as described below in connection with FIG. 3. In another embodiment, data model object names and identifiers and corresponding report data values are in report data results. In some cases, one or more data model object names and identifiers extracted from a semantic abstraction may not appear in report data results, and therefore may not have corresponding report data values. In yet a further embodiment, operation 200 is implemented on report data results from one report at a time sequentially, to extract data model object information, such as name, identifier and corresponding semantic abstraction identifier, and report data values from the data query results from each report. Alternatively, operation 200 is implemented on report data results from more than one report simultaneously. Report data results to be processed in operation 200 may be accessed from any suitable data storage repository comprising reports with report data results, such as from report repository module 118 in memory 110 or from networked data repository 122.

Index records created in operation 200 comprising data model object information, such as names, identifiers and corresponding semantic abstraction identifiers, and report data values may be stored on any suitable data storage medium, such as in a data repository. In one embodiment, indexed values for semantic abstraction identifiers include a reference to the data source(s) underlying the semantic abstraction. In another embodiment, index records created in operation 200, arranged in indexed fields are stored in a data repository particularly suited for receiving queries against the indexed fields, such as a database. In an alternative embodiment, index records created in operation 200 are stored as part of a report document, semantic abstraction or data model object from which they are extracted, or as part of an index file or object linked to a report document, semantic abstraction or data model object from which they are extracted.

The next operation of FIG. 2 is to receive a search query 202. Operation 202 may be implemented using search module 114. In one embodiment, the search query is provided by a user, such as through a search user interface. Alternatively, the search query is automatically generated, such as by a data mining program. The received search query typically comprises a text search query with one or more search terms.

The next operation of FIG. 2 is to apply the search query against the indexed fields to retrieve matching data model objects and matching report data values 204. Search module 114 may be used to implement operation 204. In an embodiment of the invention, matching data model objects include a data model object name, data model object identifier, and a corresponding semantic abstraction identifier. In another embodiment, the application of the search query against the indexed fields is implemented in a system suited for running queries against index records arranged in indexed fields, which may be incorporated in search module 114. Alternatively, a suitable system for implementing the application of the search query against indexed fields, such as a database system, may be located external to search module 114, such as on another computer (not shown), which may be dedicated for the purpose of applying search queries against indexed fields. In a further embodiment, a list of matching data model object names and identifiers and matching report data values are returned to a user, allowing for the user to select data model objects and/or report data values that match the search query.

The next operation of FIG. 2 is to generate a proposed abstract query with at least one matching data model object and a corresponding semantic abstraction 206. The BI module 116 may be used to implement operation 206. In one embodiment, the proposed abstract query has a semantic abstraction, with a semantic abstraction identifier and multiple matching data model objects, with data model object names and identifiers, which correspond to the semantic abstraction, as described below in association with FIG. 4. In another embodiment, the proposed abstract query is returned to a user. Alternatively, such as in the case where the search query is generated automatically, the proposed abstract query is stored on a suitable data storage medium or passed to other processing operations, such as a program or module.

In an optional embodiment of the invention, the next operation of FIG. 2 is to generate a query filter for the proposed abstract query, with at least one matching report data value corresponding to the semantic abstraction of the proposed abstract query 208. The BI module 116 may be used to implement operation 208. In this optional embodiment, the query filter is implemented to limit the data values returned by the at least one matching data model object to the matching report data value when the proposed abstract query comprising the query filter is executed against a data source.

In one embodiment of the invention, the proposed abstract query comprises a proposed business intelligence query for application to one or more data sources. A business intelligence query comprises an abstract query suitable for application to a data source, typically with at least one semantic abstraction and business intelligence data, for the purpose of returning data as specified by the query. In another embodiment of the invention, operation 200 of FIG. 2 is implemented in advance of operations 202, 204 and 206, in order to define indexed fields with data model object information, such as names, identifiers and corresponding semantic abstraction identifiers, and report data values, which may be stored on a suitable data storage medium, such as in a database. In this case, operations 202, 204, and 206 are implemented some time after operation 200 in order to receive and apply a search query against the indexed fields and generate a proposed abstract query. In a further embodiment, operation 200 is implemented by a separate machine in advance of operations 202, 204, and 206, such as by a dedicated server or the like. In one embodiment, extraction and indexing operation 200 may be initiated by one or more of several exemplary trigger scenarios, comprising: by arbitrary decision of a user, by scheduled one time or repeating cyclical indexing events, and upon refresh or revision of one or more reports which may logically necessitate re-extraction and indexing. Search module 114 may be used to implement extraction and indexing operation 200.

In a further embodiment of the invention, the proposed abstract query returned in operation 206 (with or without optional query filter from operation 208) may be executed against at least one data source to generate a report. The BI module 116 may be used to implement the execution of the proposed abstract query. The generated report may be formatted in the form of a default report template suitable for displaying the results of one or more data queries, or alternatively may be formatted for another report template, which may be selected from one or more optional report templates by a user or automatically.

Figure 3:
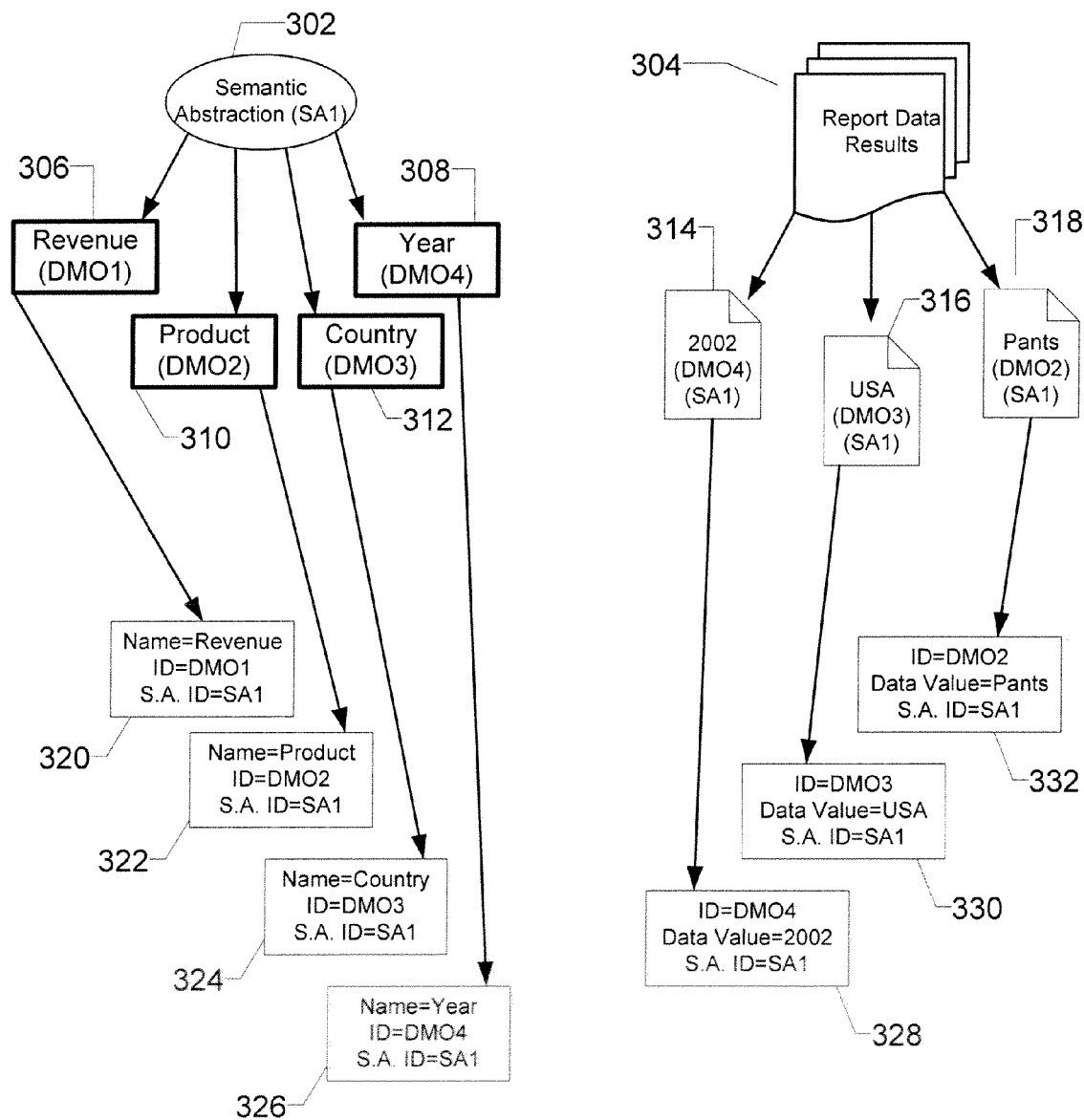
FIG. 3 illustrates an exemplary data architecture associated with a portion of an embodiment of the invention.

FIG. 3 illustrates an exemplary data architecture which may be used in the implementation of the operation 200 of FIG. 2. FIG. 3 illustrates the extraction of data model object information for data model objects 306, 310, 312 and 308 from semantic abstraction 302, to define indexed fields 320, 322, 324 and 326. According to the exemplary data architecture of FIG. 3, data model object information extracted for each data model object comprises a data model object name, data model object identifier, and semantic abstraction identifier. For example, data model object 306 comprises the data model object name "Revenue" and data model object identifier "DMO1" which corresponds to semantic abstraction 302 with semantic abstraction identifier "SA1". Indexed field 320 comprises data model object name=Revenue, data model object identifier=DMO1, and semantic abstraction identifier=SA1.

FIG. 3 additionally illustrates the extraction of report data values 314, 316 and 318 from report data results 304 to respectively define indexed fields 328, 330 and 332. For example, report data value 314 comprises the data value "2002", data model object identifier "DMO4" and the semantic abstraction identifier "SA1", which are extracted to define indexed fields 332, comprising data model object identifier=DMO4, data value=2002, and the semantic abstraction identifier=SA1.

Figure 4:
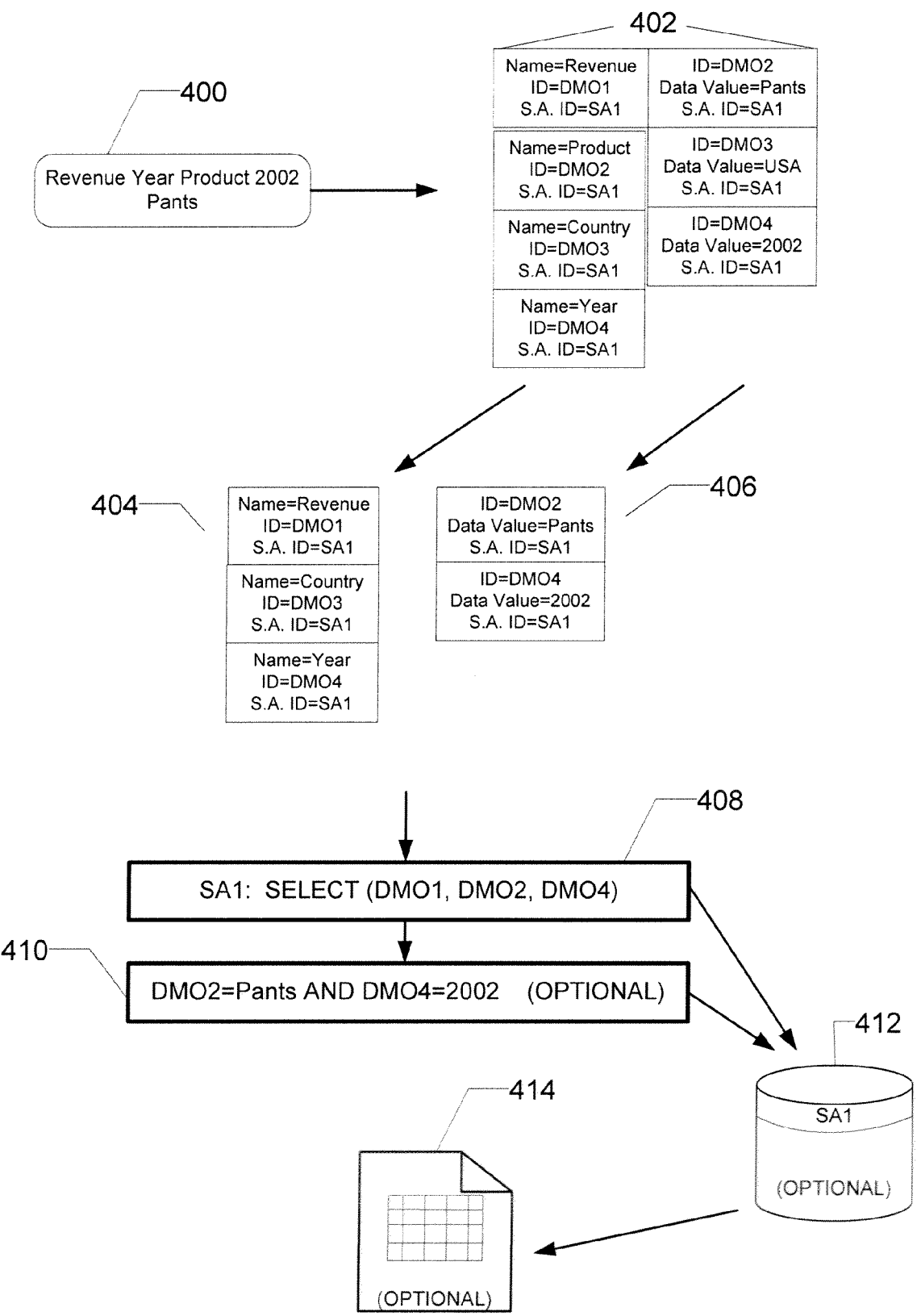
FIG. 4 illustrates an exemplary data architecture associated with a further portion of an embodiment of the invention.

FIG. 4 illustrates an exemplary data architecture which may be used in the implementation of operations 202, 204, 206 and 208 of FIG. 2. FIG. 4 illustrates receiving search query 400 and its application against indexed fields 402 to retrieve matching data model objects 404 and matching report data values 406. In this example, search query 400 comprises search terms "Revenue", "Year", "Product", "2002" and "Pants", which are applied against indexed fields 402 to retrieve matching data model objects 404. The data model objects have a data model object name that matches at least one of the search terms, and matching report data values 406, which comprise report data values that match at least one of the search terms.

FIG. 4 additionally illustrates the generation of proposed abstract query 408 which comprises matching data model objects and their corresponding semantic abstraction. In this example, the proposed abstract query 408 comprises the semantic abstraction identified by the semantic abstraction identifier "SA1" and the matching data model objects 404 with data model object identifiers "DMO1", "DMO2" and "DMO3", associated with semantic abstraction identifier "SA1". The exemplary proposed abstract query 408 is shown in the form of a SELECT statement comprising all the matching data model object identifiers which correspond to semantic abstraction identifier "SA1" from the matching data model objects 404.

Exemplary query filter 410 may be generated according to optional operation 208 of FIG. 2. In this example, the query filter comprises matching data values 406 that correspond to the semantic abstraction identifier "SA1" of the proposed abstract query 408. In this case, exemplary query filter 410 comprises the matching data values of data model object DMO2=Pants and data model object DMO4=2002. The effect of exemplary query filter 410 is to limit the data values returned by data model objects DMO2 and DMO4 to the matching report data values "Pants" and "2002", respectively. FIG. 4 also illustrates the optional execution of proposed abstract query 408 and optional application of the query filter 410 against data source 412 to generate exemplary report 414.

Figure 5:
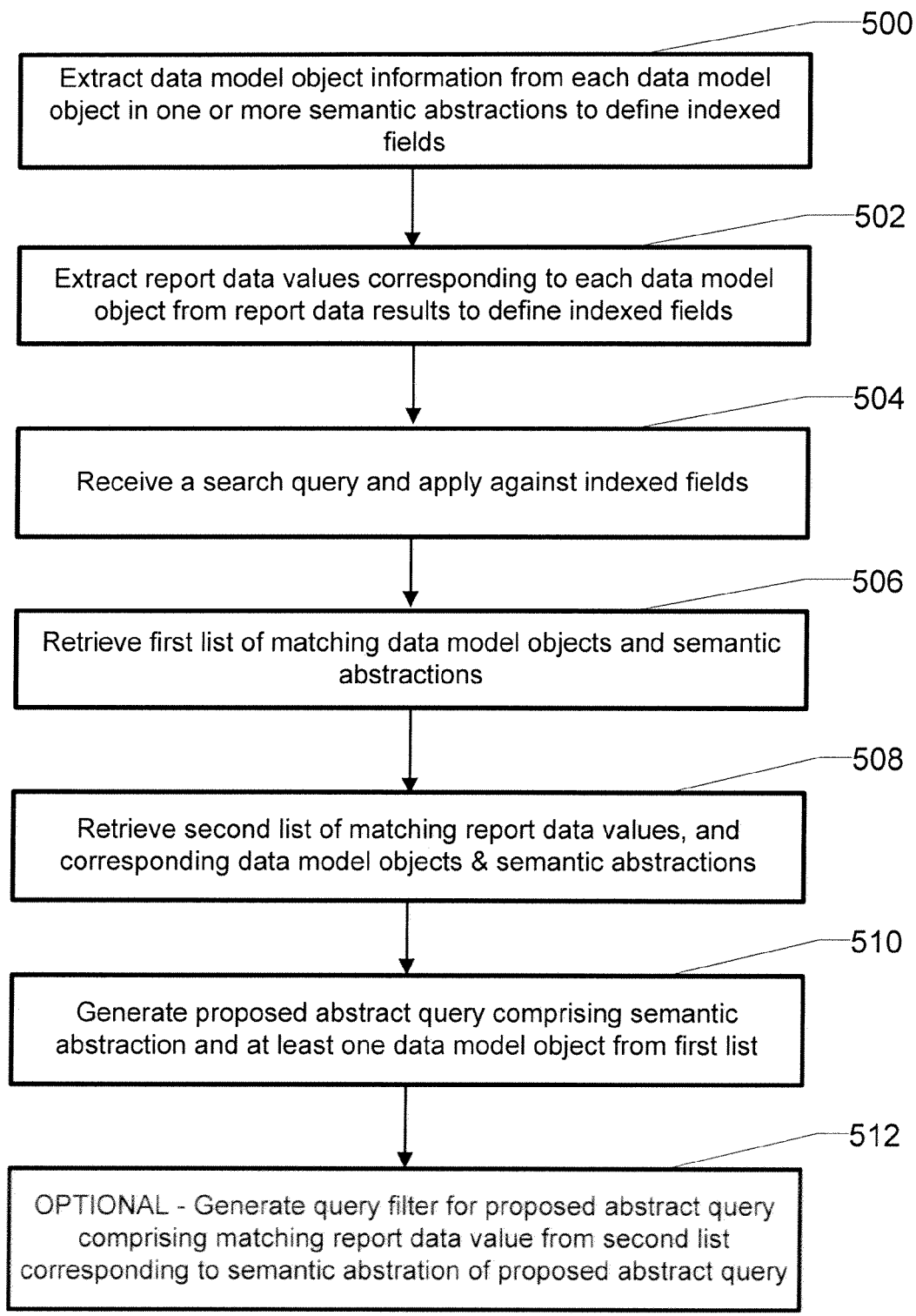
FIG. 5 illustrates further processing operations associated with another embodiment of the invention.

FIG. 5 illustrates a series of processing operations in accordance with another embodiment of the invention. The first operation of FIG. 5 is to extract data model object information for each data model object in one or more semantic abstractions to define indexed fields 500. Operation 500 may be implemented using search module 114. In an embodiment of the invention comprising multiple semantic abstractions, referred to as a collection of semantic abstractions, the collection of semantic abstractions may collectively describe one or more underlying data sources, examples of which may include relational databases and multidimensional data bases, such as OLAP cubes. In an embodiment of the invention, data model object information may comprise at least one of: a data model object name, data model object identifier, and a corresponding semantic abstraction identifier The next operation of FIG. 5 is to extract report data values corresponding to each data model object in one or more semantic abstractions from report data results to define indexed fields 502. The report data results may comprise results from one or more reports, and may be accessed from any suitable data storage repository comprising reports with report data results.

The next operation of FIG. 5 is to receive a search query and apply the search query against the indexed fields 504. In one embodiment of the invention, the search query may be received from a user. Search module 114 may be used to implement this operation.

The next operation of FIG. 5 is to retrieve a first list of matching data model objects and corresponding semantic abstractions 506. The first list comprises any indexed data model object information (such as data model object name, for example) that matches one or more of the search terms in the search query.

The next operation of FIG. 5 is to retrieve a second list of matching report data values and corresponding data objects and semantic abstractions 508. The second list comprises any indexed report data values that match one or more of the search terms in the search query, and corresponding data model objects and corresponding semantic abstractions.

Operation 510 of FIG. 5 corresponds to previously discussed operation 206 of FIG. 2. In an optional embodiment of the invention, optional operation 512 of FIG. 5 corresponds to previously described operation 208 of FIG. 2.

As in the operations of FIG. 2, in a further embodiment of the invention, the proposed abstract query returned in operation 510 (with or without optional query filter from operation 512) may be executed against at least one data source to generate a report. Operations 500 and 502 may be implemented in advance of the remaining operations of FIG. 5.

Figure 6:
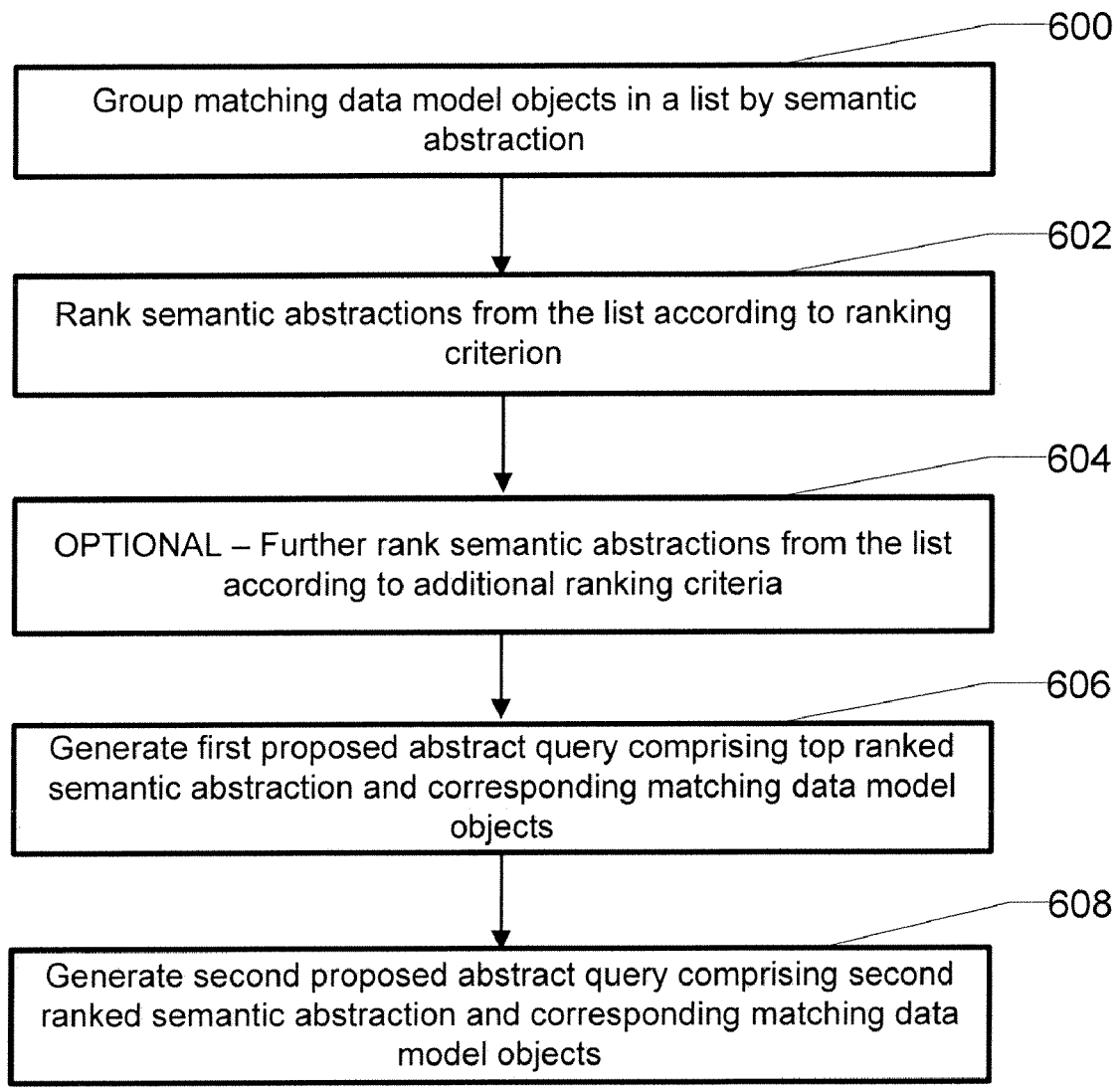
FIG. 6 illustrates processing operations associated with an embodiment of the invention comprising multiple proposed queries.

FIG. 6 illustrates processing operations according to an embodiment of the invention for generating multiple proposed abstract queries. The operations of FIG. 6 may replace operations 206 and 510 of FIG. 2 and FIG. 5 respectively, in embodiments of the present invention for generating multiple proposed abstract queries for more than one semantic abstraction. The first operation of FIG. 6 is to group matching data model objects in a list by semantic abstraction 600. Operation 600 may be implemented by search module 114 or alternatively by BI module 116.

The next operation of FIG. 6 is to rank the semantic abstractions from the list according to a ranking criterion 602. Operation 602 may be implemented by search module 114 or alternatively by BI module 116. Any suitable ranking criterion may be applied in operation 602. In one embodiment, the ranking criterion comprises the number of matching data model objects that are measure data model objects corresponding to each semantic abstraction. In an optional embodiment, the next operation of FIG. 6 is to further rank semantic abstractions from the list according to additional ranking criteria 604. In a further optional embodiment, the additional ranking criteria comprises the total number of matching data model objects for each semantic abstraction. Alternatively, the additional ranking criteria comprises the total number of data model objects (matching and non-matching data model objects) corresponding to each semantic abstraction.

The next operation of FIG. 6 is to generate a first proposed abstract query with the top ranked semantic abstraction and matching data model objects 606. Operation 606 may be implemented by the BI module 116.

The next operation of FIG. 6 is to generate a second proposed abstract query with the second ranked semantic abstraction and matching data model objects 608. Operation 608 may also be implemented by the BI module 116.

Figure 7:
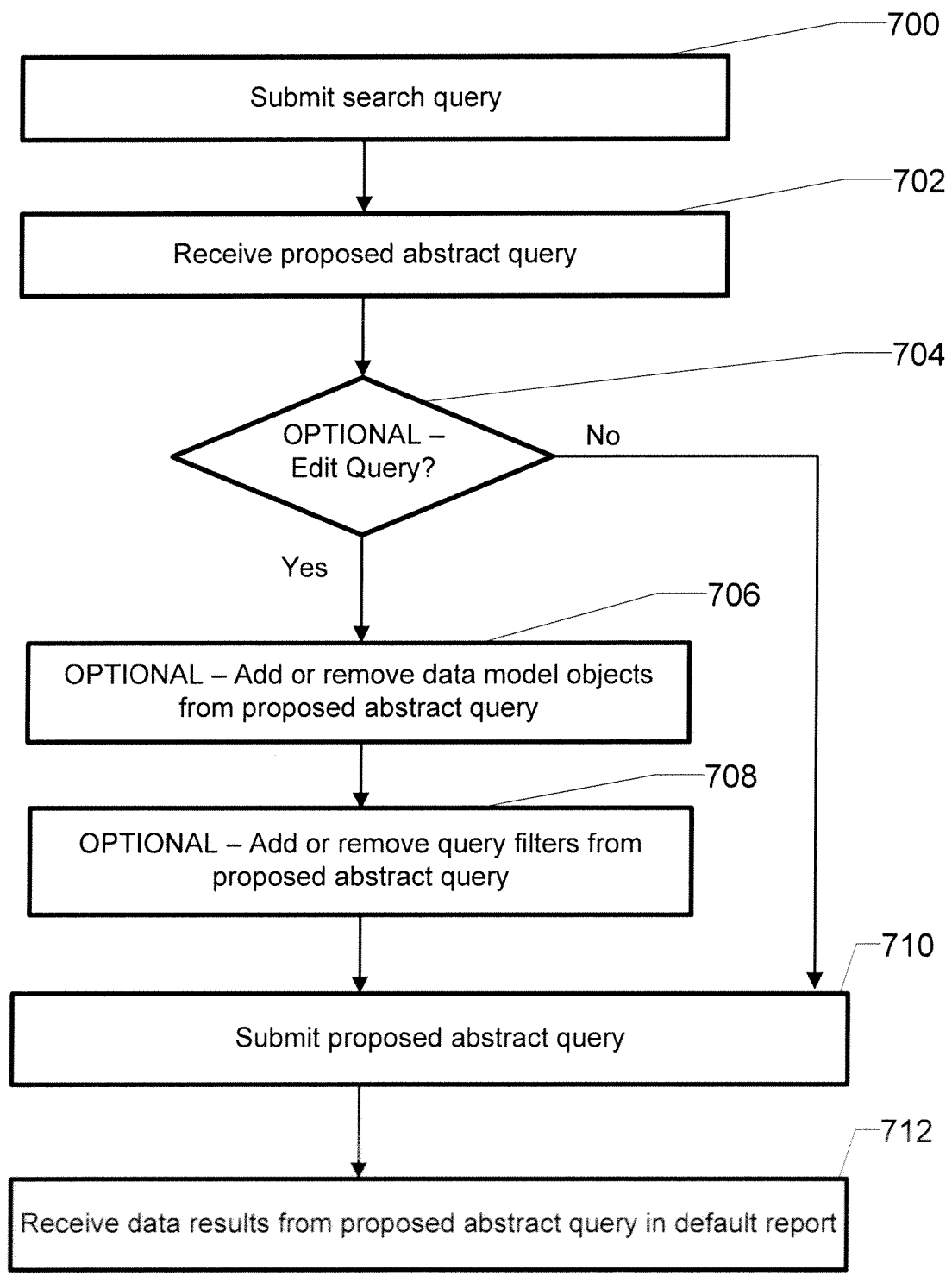
FIG. 7 illustrates workflow operations associated with a user-oriented embodiment of the invention.

FIG. 7 illustrates a series of workflow operations associated with a user-oriented embodiment of the invention. The first operation of FIG. 7 is to submit a search query 700. The search module 114 may be used to implement this operation. The search query may include one of more search terms that are submitted in text form by means of a search query entry box.

The next operation of FIG. 7 is to receive a proposed abstract query 702. The BI module 116 may be used to implement this operation. According to one embodiment, the proposed abstract query may be received by a user in a text or graphical format, such as in a graphical user interface connected to computer 100.

In an optional embodiment of the invention, the next optional operation of FIG. 7 is to select whether to edit the proposed abstract query 704. According to one embodiment, a user may select whether to edit the abstract query such as by selecting a button in a graphical user interface. In an optional embodiment where a user selects to edit the proposed abstract query, the next optional operation of FIG. 7 is to add or remove data model objects from the proposed abstract query 706. The next optional operation of FIG. 7 is to add or remove query filters from the proposed abstract query 708. In either of operations 706 and 708, a user may add or remove data model objects or query filters from the proposed abstract query by means of a graphical user interface, such as by selecting a button or link. Optional operations 704, 706, and 708 may be implemented by BI module 116.

The next operation of FIG. 7 is to submit the proposed abstract query 710. BI module 116 may be used to implement operation 710. In one embodiment of the invention, the proposed abstract query may be executed against at least one data source to return data results. The BI module 116 may also be used to execute the submitted abstract query against the at least one data source.

The last operation of FIG. 7 is to receive data results from the proposed abstract query in a default report 712. This operation may be implemented using BI module 116. According to one embodiment of the invention, the default report may be formatted in a form generally suitable for displaying the results of one or more abstract queries, such as according to a default report template. Alternatively, the received data results may be formatted in the form of another report template which may be selected from one or more optional report templates by a user or automatically. In another embodiment, the default or other selected report generated according to operation 712 is received by a user in a graphical user interface.

Figure 8:
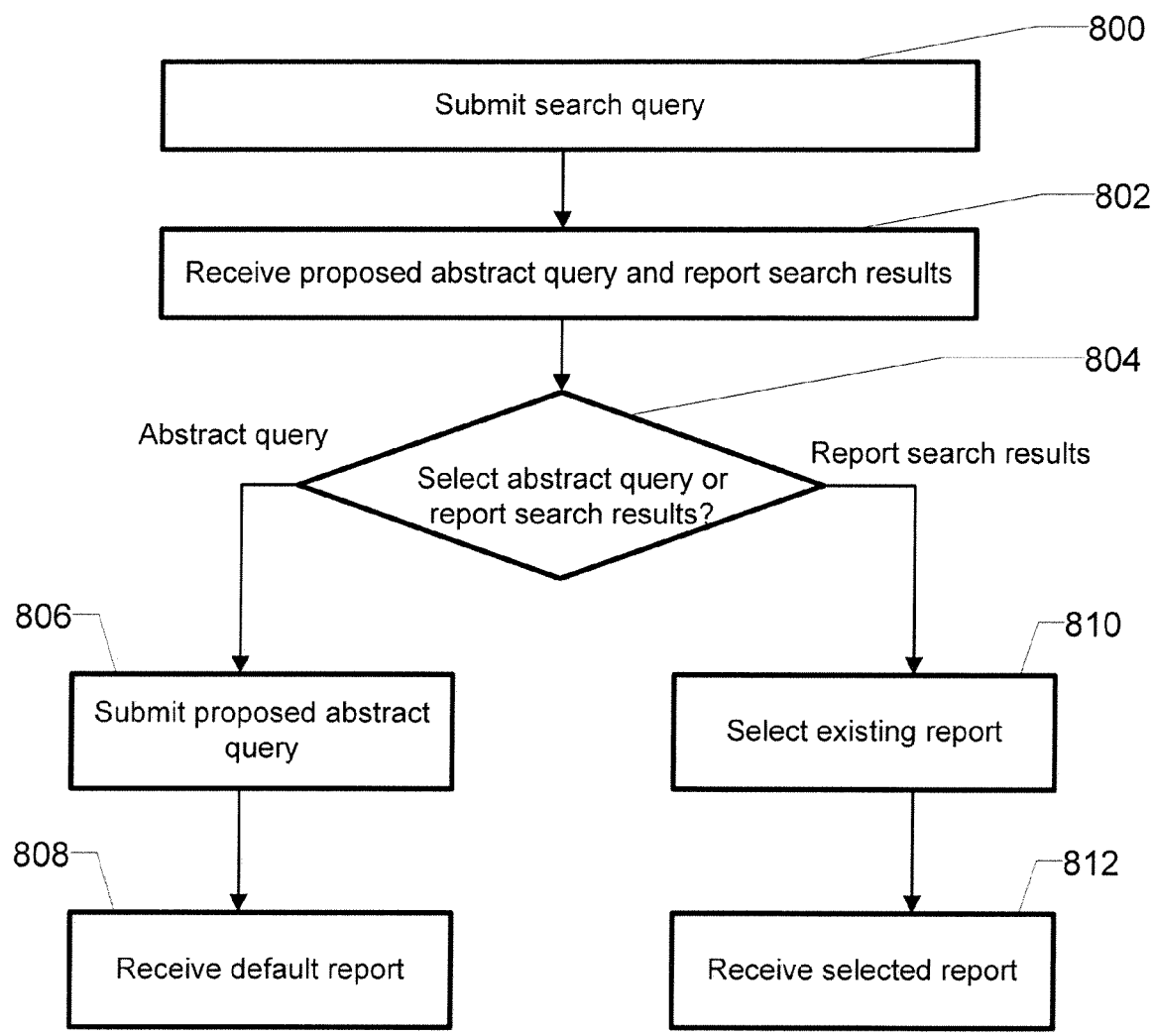
FIG. 8 illustrates a series of workflow operations associated with a further user-oriented embodiment of the invention.

FIG. 8 illustrates a series of workflow operations associated with a further user-oriented embodiment of the invention with multiple search options that may be implemented by computer 100. The first operation of FIG. 8 is to submit a search query 800. Operation 800 of FIG. 8 generally corresponds to previously described operation 700 of FIG. 7. In one embodiment, the search query of operation 800 may be submitted in a search query input box or pane of a graphical user interface comprising multiple search input and result panes, such as the graphical user interface described below in association with FIG. 9.

The next operation of FIG. 8 is to receive a proposed abstract query and report search results 802. Search module 114 may be used to implement operation 802.

The next operation of FIG. 8 is to select between the proposed abstract query and the report search results 804. Search module 114 may be used to implement operation 804, or alternatively, BI module 116 may be used. According to an embodiment of the invention, a user may select between the proposed abstract query and the report search results by selecting a button or link in a graphical user interface comprising multiple search input and result panes. Alternatively, a selection between the proposed abstract query and the report search results may be made automatically, such as based on a determination of the relevance of the proposed abstract query to the search query, relative to the relevance of the report search results.

In an embodiment where the proposed abstract query is selected in operation 804, the next operation of FIG. 8 is to submit the proposed abstract query 806. BI module 116 may be used to implement operation 806. In one embodiment of the invention, a user may submit the proposed abstract query, or in the case when more than one proposed abstract query is received in operation 802, a user may submit a chosen proposed abstract query such as by selecting a button or link or the like in a pane of a graphical user interface. The next operation of FIG. 8 is to receive a default report 808. In one embodiment, the default report comprises report data results returned from the execution of the submitted proposed abstract query against one or more data sources. The default report may be displayed to a user.

In an embodiment where the report search results are selected in operation 804, the next operation of FIG. 8 is to select an existing report from the report search results 810 BI module 16 may be used to implement operation 810. According to an embodiment of the invention, a user may select an existing report such as by selecting a button or link displayed in a pane of a graphical user interface displaying report search results comprising one or more existing reports. The next operation of FIG. 8 is to receive a selected existing report 812 from the report search results. BI module 116 may be used to implement operation 812 or alternatively report repository module 118 may be used.

Figure 9:
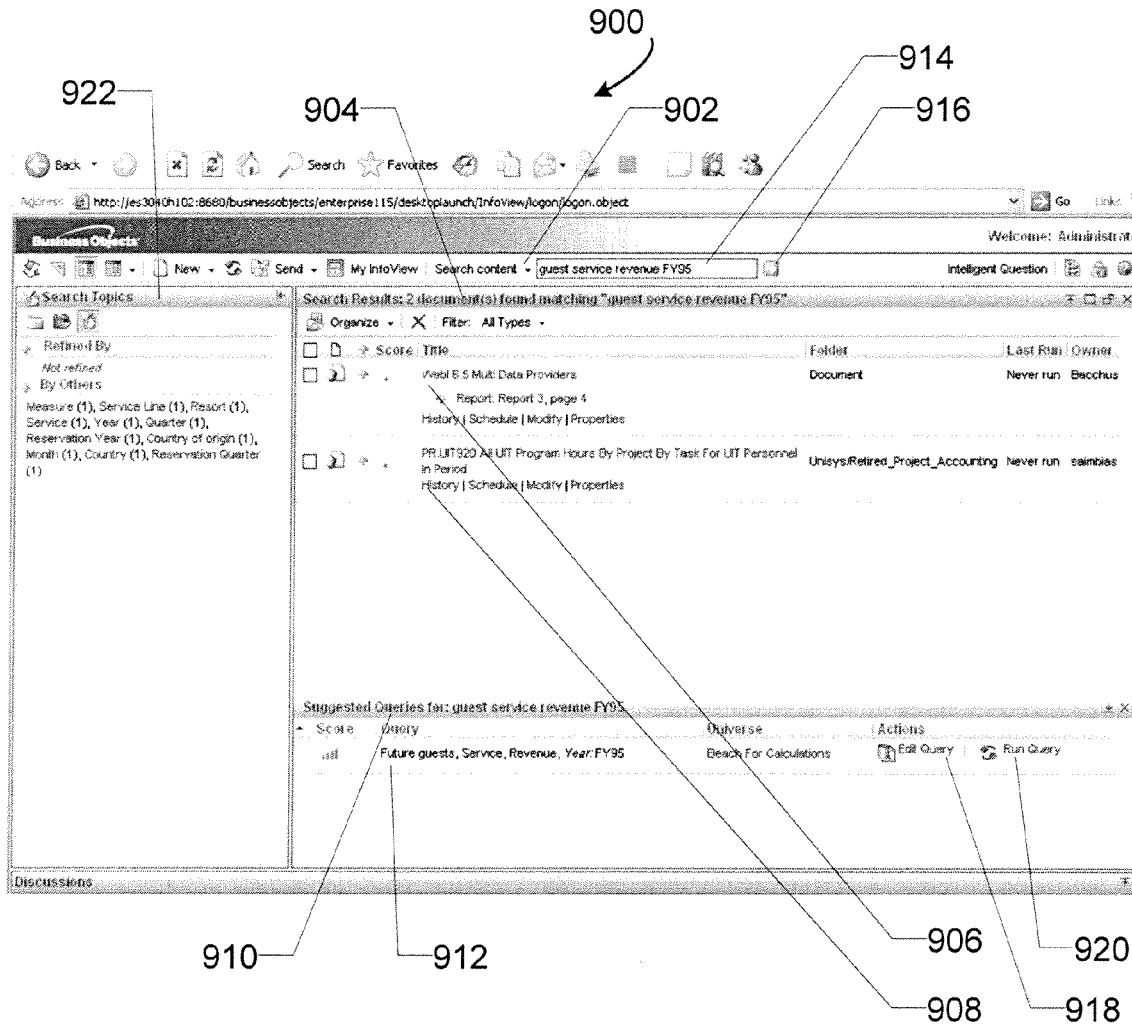
FIG. 9 illustrates a graphical user interface associated with an embodiment of the invention.

FIG. 9 illustrates a graphical user interface (GUI) 900 used to implement an embodiment of the invention. The GUI 900 could be included in a window presented on an output device of computer 100. In one embodiment, GUI 900 typically comprises multiple panes, including search query pane 902, report search result pane 904, proposed abstract query pane 910 and optionally, related links pane 922. Search query pane 902 comprises search query input box 914 and search query submit button 916, which are used to input a search query by entering one or more search terms, and to submit the search query, respectively.

Report search result pane 904 displays report results returned by the execution of a search query against index records from one or more existing reports, comprising existing report links 906 and 908. Optionally, report results displayed in report search result pane 904 may also include additional information or metadata pertaining to the existing reports in the returned report search results, such as the name, date, author, location, history, schedule of the existing reports, for example.

Proposed abstract query panel 910 displays proposed abstract query 912 generated from the execution of a search query against index records from one or more semantic abstractions, such as by implementing the processing operations described above in FIG. 2 or FIG. 5. In one embodiment, proposed abstract queries displayed in pane 910 include abstract query edit link 918 and/or abstract query execution link 920, to allow a user to edit proposed abstract query 912 or execute abstract query 912 against a data source, respectively. In addition, proposed abstract queries displayed in pane 910 may also include additional information or metadata pertaining to the proposed abstract queries, such as a query relevancy rating or semantic abstraction identifier or the like.

Optional related links pane 922 displays links or buttons identifying categories generated from common metadata or other information related to search terms of a search query entered. In one optional embodiment, a user can retrieve a list of the semantic abstractions, data model objects, report data results and/or existing reports that correspond to a displayed category link or button by selecting the link or button in related links pane 922.

Figure 10:
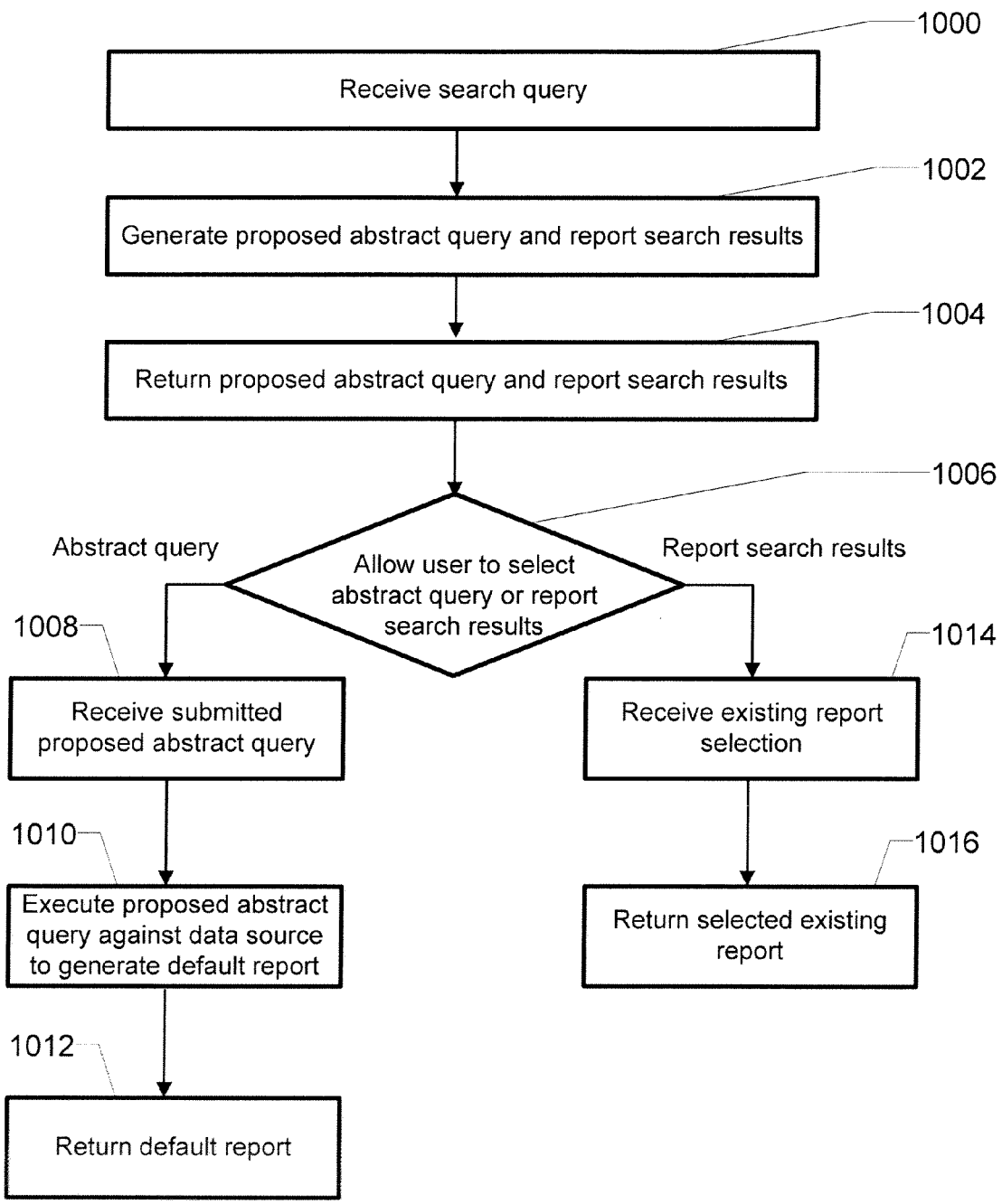
FIG. 10 illustrates processing operations associated with an embodiment of the invention.

FIG. 10 illustrates multiple search options that may be implemented by computer 100. The first operation of FIG. 10, 1000 generally corresponds to operation 202 of FIG. 2 as described above.

The next operation of FIG. 10 is to generate a proposed abstract query and report search results 1002. Search module 114 may be used to implement operation 1002. In one embodiment, the proposed abstract query is generated as described above in reference to operation 206 of FIG. 2. In another embodiment, the report search results are generated according to the report search processing operations described in commonly owned and concurrently filed U.S. Patent Application titled "Method and Apparatus for Searching Reports", Ser. No. 11/537,597, filed Sep. 29, 2006, which is incorporated herein by reference in its entirety, such as in FIG. 2 of the patent application.

The next operation of FIG. 10 is to return the proposed abstract query and report search results 1004. Operation 1004 may be implemented using search module 114. In one embodiment of the invention, the returned proposed abstract query and report search results are displayed to a user in panes of a graphical user interface comprising multiple search input and result panes on an output device attached to computer 100.

The next operation of FIG. 10 is to allow a user to select between a proposed abstract query or report search results 1006. Search module 114 may be used to implement operation 1006, or alternatively, BI module 116 may be used.

In an embodiment where the user selects a proposed abstract query in operation 1006, the next operation of FIG. 10 is to receive a submitted proposed abstract query 1008. BI module 116 may be used to implement operation 1008. Thereafter, the next operation of FIG. 10 is to execute the submitted proposed abstract query against at least one data source to generate a default report 1010. Thereafter, the next operation of FIG. 10 is to return the default report 1012.

In an embodiment where the user selects the report search results in operation 1006, the next operation of FIG. 10 is to receive an existing report selection 1014. BI module 116 may be used to implement operation 1014. In one embodiment of the invention, a user may make an existing report selection, such as by selecting a button or link displayed in a pane of a graphical user interface displaying report search results. Thereafter the next operation of FIG. 10 is to return the selected existing report 1016. BI module 116 may be used to implement operation 1016 or alternatively report repository module 118 may be used.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
    extract data model object information from data model objects in at least one semantic abstraction, wherein the data model object information includes a data model object name, a data model object identifier and a semantic abstraction identifier;
    extract from report data results, a report data value and data model object identifier, wherein the data model object identifier corresponds to a data model object name associated with the data model object information, and wherein the report data results are from a report with information automatically retrieved from a data source, where the information is structured in accordance with a report schema;
    define indexed fields including fields specifying a data model object name, a data model object identifier, a semantic abstraction identifier and a report data value;
    receive a search query;
    apply the search query against the indexed fields to define matching data model objects and matching report data values; and
    generate a proposed abstract query comprising at least one matching data model object and a corresponding semantic abstraction.

2. The computer readable storage medium according to claim 1 wherein the proposed abstract query additionally comprises a query filter with at least one matching report data value.

3. The computer readable storage medium according to claim 1 wherein the search query is received from a user.

4. The computer readable storage medium according to claim 1 wherein the search query is generated automatically.

5. The computer readable storage medium according to claim 1 further comprising executable instructions to execute the proposed abstract query against at least one data source to generate a default report.

6. The computer readable storage medium according to claim 5 wherein the default report has a user specified report format.

7. The computer readable storage medium according to claim 1 further comprising executable instructions to store the indexed fields in a database.

8. The computer readable storage medium according to claim 1 wherein the proposed abstract query comprises a proposed business intelligence query.

9. The computer readable storage medium according to claim 1 further comprising executable instructions to return a list with matching data model object names and identifiers, and matching report data values.

10. A computer readable storage medium, comprising executable instructions to:
    extract data model object information for data model objects in at least one semantic abstraction, to define a first set of indexed fields including a data model object name, a data model object identifier and a semantic abstraction identifier;
    extract report data values from data model objects in report data results to define a second set of indexed fields including a report data value and a data model object name associated with a data model object name in the first set of indexed fields, wherein the report data results are from a report with information automatically retrieved from a data source, where the information is structured in accordance with a report schema;
    apply search terms in a search query against the first and second sets of indexed fields;
    retrieve a first list of search query results with matching data model objects and corresponding semantic abstractions;
    retrieve a second list of search query results with matching report data values and corresponding data model objects and semantic abstractions; and
    generate a proposed abstract query with a semantic abstraction from the first list and at least one matching data model object of the semantic abstraction.

11. The computer readable storage medium according to claim 10 wherein the proposed abstract query additionally comprises a query filter with at least one matching report data value from the second list.

12. The computer readable storage medium according to claim 10 wherein the executable instructions to generate additionally comprise executable instructions to:
    group data model object identifiers from the first list by semantic abstraction identifier;
    rank semantic abstraction identifiers from the first list according to at least one ranking criterion;
    generate a first proposed abstract query with a top ranked semantic abstraction identifier from the first list, and at least one matching data model object identifier corresponding to the top ranked semantic abstraction identifier; and
    generate a second proposed abstract query with a second ranked semantic abstraction identifier from the first list, and at least one matching data model object identifier corresponding to the second ranked semantic abstraction identifier.

13. The computer readable storage medium according to claim 12 wherein the at least one ranking factor is the number of matching data model objects for each semantic abstraction.

14. The computer readable storage medium according to claim 12 wherein the at least one ranking factor is the number of matching data model objects that are measures.

* * * * *